No. 862,278. PATENTED AUG. 6, 1907.
G. W. NYE.
PIPE CUTTING AND THREADING TOOL.
APPLICATION FILED MAY 26, 1906.
2 SHEETS—SHEET 1.
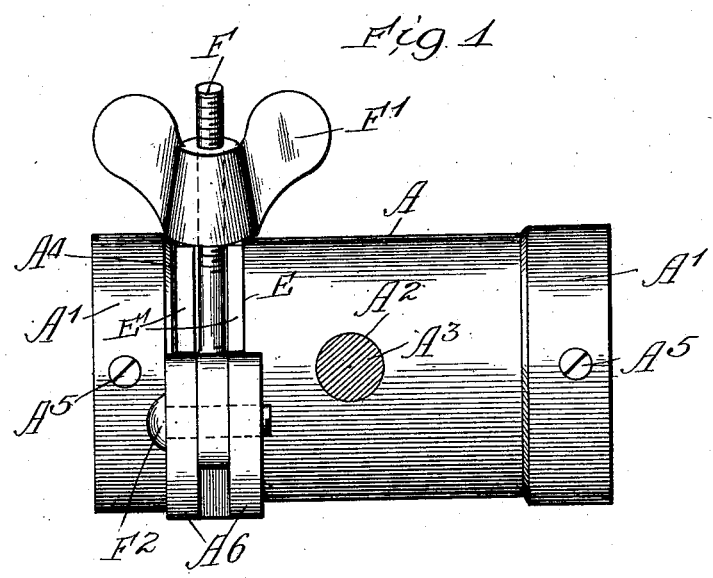
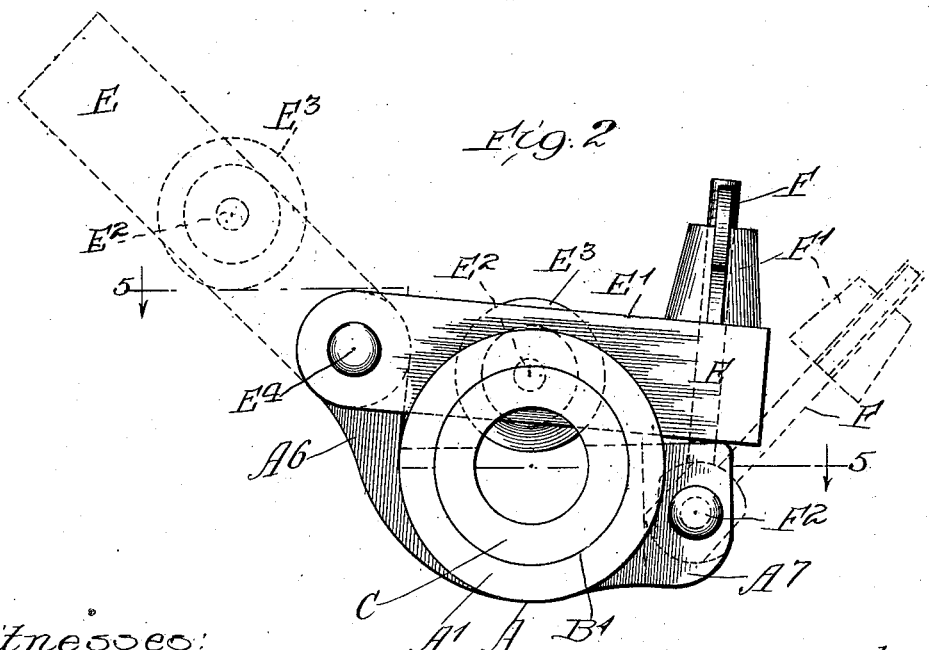
Witnesses:
Harry R. L. White
Ray White.
Inventor:
George W. Nye,
By Morgan & Rubinstein Attys No. 862,278. PATENTED AUG. 6, 1907.
G. W. NYE.
PIPE CUTTING AND THREADING TOOL.
APPLICATION FILED MAY 26, 1906.
2 SHEETS—SHEET 2.
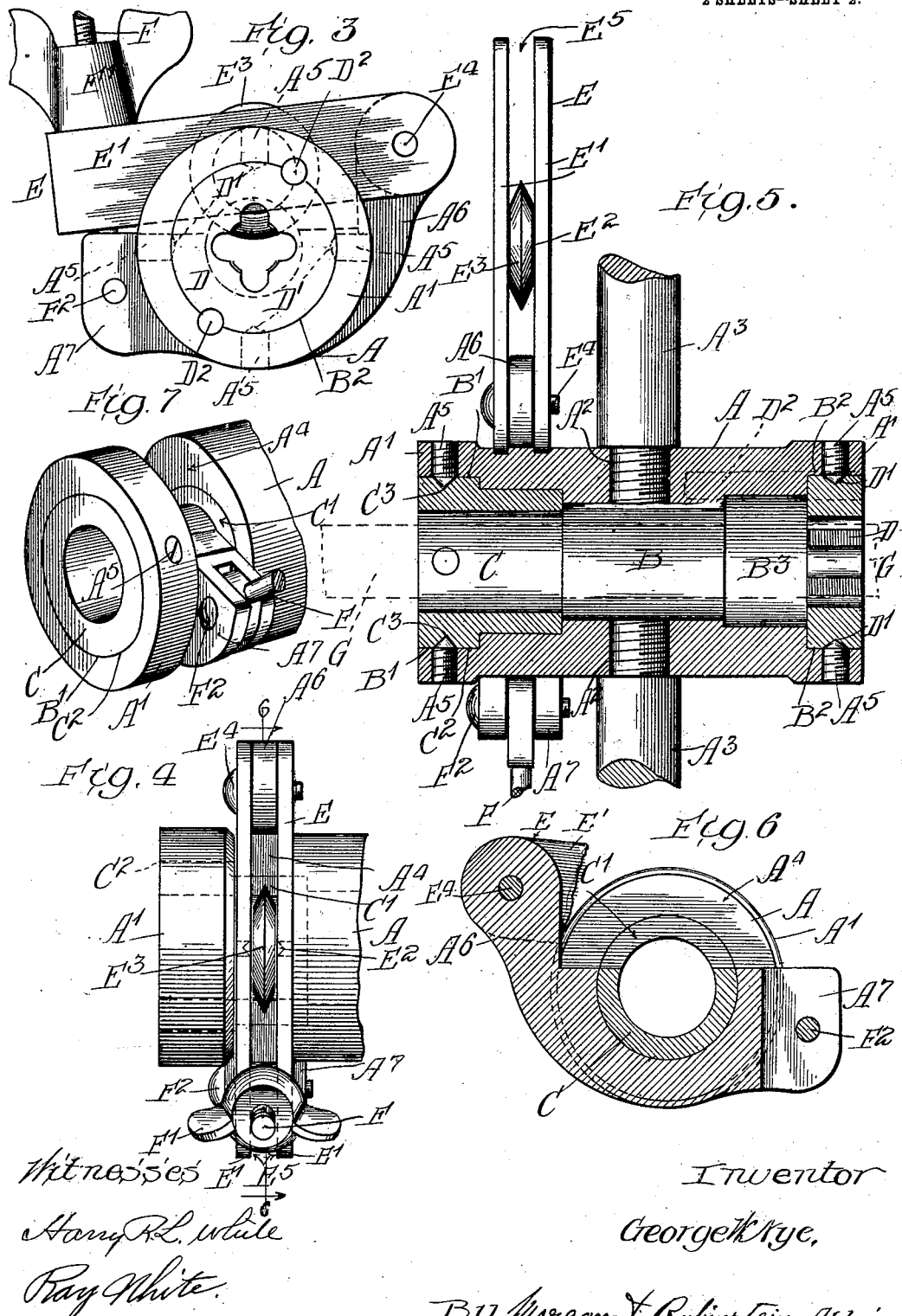
Witnesses
Harry R L White
Ray White
Inventor
George W Nye,
By Morgan & Rubinstein Attys

UNITED STATES PATENT OFFICE.

GEORGE W. NYE, OF CHICAGO, ILLINOIS.

PIPE CUTTING AND THREADING TOOL.

No. 862,278.   Specification of Letters Patent.   Patented Aug. 6, 1907.

Application filed May 26, 1906. Serial No. 318,926.

*To all whom it may concern:*

Be it known that I, GEORGE W. NYE, a citizen of the United States, residing at 731 Carmen avenue, in the city of Chicago, county of Cook, and State of Illinois, have invented a new and useful Improvement in Pipe Cutting and Threading Tools, of which the following is a specification.

My invention relates to that class of tools operated by hand in cutting and threading pipe used in gas, water and steam fittings.

The object of my invention is to produce a simple, cheap and convenient pipe cutting and threading tool adjustable to the several sizes of pipe; and that can be instantly changed so as to be used for either cutting or threading purposes.

The manner in which I accomplish my object is described in the following specification and illustrated in the accompanying drawings in which:

Figure 1 is a face view showing the cutter lever closed. Fig. 2 is an end view showing the cutter lever open and closed the full lines illustrating the closed position as shown in Fig. 1, and the dotted lines showing the open position of the same parts. Fig. 3 is an end view showing the threading die in position, and the cutter lever closed. Fig. 4 is a top view of the pipe cutter end, the cutter lever being closed. Fig. 5 is a central section on the line 5—5 Fig. 2. Fig. 6 is a cross sectional view on the line 6—6 Fig. 4. Fig. 7 is a perspective view of the pipe cutter end showing the bushing in position.

In the drawings A is the main body, this is preferably cylindrical in form, the ends $A^1$ being enlarged to afford the necessary thickness of metal. In the center of the length of the main body are two threaded holes $A^2$ adapted to receive and hold handles $A^3$. The interior of this body is cylindrical, the central part B being adapted to receive the largest size tube for which the tool is designed.

The end part $B^1$ is enlarged and adapted to hold a removable bushing C. The other end $B^2$ is also enlarged and adapted to hold a removable threading die D. As many bushings and dies are used as there are differences of size in the pipes designed to be cut and threaded. In the side of each bushing is a channel $C^1$ adapted to correspond with a like channel $A^4$ in the main body. In the periphery $C^2$ of the bushing are recesses $C^3$. Set screws $A^5$ in the main body engage the bushing in these recesses and hold it in position therein. There are similar recesses $D^1$ in the die, and set screws $A^5$ in the main body adapted to engage the die in these recesses and hold it in position. The dowel pins $D^2$ prevent the die from turning in its position. The interior of the main body at $B^3$ is larger than the central part B and is adapted thereby to allow space for the material cut from the largest size pipe to move in advance of the face of the die when the pipe is being threaded.

Forming part of the body A are projections $A^6$ and $A^7$. Pivotally attached to the projection $A^6$ is a lever E, constructed of two parallel bars $E^1$. Supported between these bars on a transverse shaft $E^2$ affixed in said bars is a circular pipe cutter $E^3$. The lever E pivoting on the pin $E^4$ is adapted to be moved into and out of the channel $A^4$ in the main body and channel $C^1$ in the bushing C. Pivotally supported on the projection $A^7$ is a threaded bolt F and thumb nut $F^1$. This bolt and nut is pivoted on the pivot pin $F^2$ and is adapted to be moved into and out of engagement with the open free end $E^5$ of the lever E when it is in the channel $A^4$, and to be used for the purpose of applying pressure to said lever and thereby forcing the cutter $E^3$ into the pipe in the operation of cutting a pipe.

When the tool is constructed as described and the several parts are in the closed position as shown in the several figures it is used as follows: The thumb nut $F^1$ on the bolt F is reversed and both are moved out of engagement with the open end $E^5$ of the lever E as shown by the dotted lines in Fig. 2. The lever E is then lifted out of the channel in the bushing and main body, and moved back into the position as shown by the dotted lines in Fig. 2 and full lines in Fig. 5. If a pipe is to be cut and its length requires the die D is removed to let the pipe pass through. The handles being adjusted, the tool is then slipped over the pipe G which is held in a pipe vise or by other means. The lever E is then moved into the closed position the cutter $E^3$ resting on the pipe. The bolt F and thumb nut is then moved into engagement with the open end of the lever E and the nut is screwed down, and the cutter is thereby forced into the pipe. The pressure applied by the nut is maintained on the lever as the body A is rotated about the pipe, by the turning of the thumb nut till the cutter is forced through the pipe. A reversal of the movement of the thumb nut releases the lever, which is then raised out of the channel in the main body and bushing.

For threading pipe, the bushing and die adapted in size to the pipe to be threaded are inserted in the body A, and the bushing end slipped over the pipe first, the die is adjusted on the end of the pipe and rotated by one or more handles secured in the main body. For convenience in carriage, the handles are removed from the main body.

What I claim and desire to secure by Letters Patent is:

1. A device of the kind described, consisting of a main hollow cylindrical body adapted internally to hold a bushing, said body having radial apertures for the insertion of handles, and an external transverse channel to admit a cutter lever intermediate of one end of said body and the radial apertures therein, transverse projections on opposite sides of said body in line with the central length of said channel, an open ended cutter lever and circular disk cutter centrally supported in said lever, said lever being pivotally secured to one of said projections and adapted to be moved vertically in said channel, a threaded bolt pivotally secured to the other projection, a thumb nut on said bolt, said bolt and nut being adapted to engage the open end of said lever and to press said lever down into said channel, a cylindrical bushing having an external transverse channel adapted to correspond with the channel in the main body, said bushing being insertible in said main body, and a pair of handles insertible in the radial apertures in said main body as described.

2. In a device of the kind described, the combination with a main body adapted internally to support a bushing, and having an external transverse channel, and radial apertures adapted for the insertion of operating handles; of a bushing insertible in said body, said bushing having an external transverse channel adapted to register with said channel in said body, means for securing said bushing in position in said body; a lever secured at one end to said body, adapted to fit said transverse channel in said body and bushing and to support a circular cutter; a circular cutter rotatably supported in said lever; and means for moving said lever and cutter vertically in said channels, as described.

3. In a device of the kind described, the combination with a hollow cylindrical body adapted internally at either end to hold a bushing, said body having an open transverse channel adapted to admit and to guide a cutter lever, and having means for the attachment of radial operating handles thereto; of the cutter lever pivotally secured to said body and adjustable vertically in said channel, the circular disk cutter centrally supported in said lever; means for engaging and disengaging the free end of said lever and forcing said lever and cutter down in said channel, a bushing insertible in said body, and handles for operating said device, as described.

4. In a device of the kind described, the combination with the main hollow cylindrical body and transverse cutter lever pivotally secured and adjustable in the transverse channel in said body; of a circular disk cutter centrally supported in said lever, the means secured to said body adapted to operate said lever, vertically in said channel, the bushing insertible in said main body, and means attachable to said main body adapted to rotate said body, as described.

5. In a device of the kind described, the combination with the main hollow cylindrical body having a transverse channel, the transverse cutter lever and disk cutter pivotally supported on said body in said channel, of a threaded bolt pivotally secured to said main body, a thumb nut on said bolt, said bolt and nut being adapted to engage and operate said cutter lever, the bushing channeled insertible in said main body, and the handles for rotating said body, as described.

6. In a device of the kind described, the combination with the main cylindrical body channeled transversely, the cutter lever and disk cutter pivotally attached to said body, and the bolt and thumb nut pivotally secured to said body, of a bushing insertible in said body said bushing having an external transverse channel, adapted to correspond with the channel in said main body, means for securing said bushing in said body, and means for rotating said main body, as described.

7. In a device of the kind described, the combination with the main body channeled transversely, the cutter lever and disk cutter adjustably supported in the channel of said body, the means secured to said body for operating said lever, and the channeled bushing in said main body; of the detachable handles adapted to rotate said main body, as described.

GEORGE W. NYE.

Witnesses:
JOSEPH STAAB,
THOMAS J. MORGAN.